(12) United States Patent
Janson

(10) Patent No.: US 6,856,681 B2
(45) Date of Patent: Feb. 15, 2005

(54) DEVICE FOR CONNECTING A DATA PROCESSING DEVICE TO A TELECOMMUNICATIONS SYSTEM

(75) Inventor: Manfred Janson, Lichtenau (DE)

(73) Assignee: Siemens Aktiengesellschaft, Munich (DE)

( * ) Notice: Subject to any disclaimer, the term of this patent is extended or adjusted under 35 U.S.C. 154(b) by 524 days.

(21) Appl. No.: 09/885,555

(22) Filed: Jun. 20, 2001

(65) Prior Publication Data

US 2001/0055381 A1 Dec. 27, 2001

(30) Foreign Application Priority Data

Jun. 20, 2000 (DE) .......................................... 100 30 122

(51) Int. Cl.⁷ ........................... H04L 5/22; H04M 3/00; H04M 7/00; H04Q 11/04
(52) U.S. Cl. ........................ 379/269; 370/294; 370/376; 379/219; 379/242
(58) Field of Search ................................. 370/259, 294, 370/362, 375, 376; 379/201.01, 207.02, 219, 242, 269

(56) References Cited

U.S. PATENT DOCUMENTS

| 5,649,005 A | 7/1997 | Lynch et al. | ................. 379/242 |
|---|---|---|---|
| 5,805,692 A | * 9/1998 | Oerlemans et al. | ......... 379/225 |
| 6,052,461 A | * 4/2000 | Lam | ........................... 379/297 |

FOREIGN PATENT DOCUMENTS

| DE | 197 45 026 A1 | 4/1998 | .......... H04M/11/00 |
|---|---|---|---|
| EP | 0 982 968 A1 | 3/2000 | ........... H04Q/11/04 |
| GB | 2 318 480 A | 4/1998 | .......... H04Q/3/545 |

OTHER PUBLICATIONS

Stephen Kempainen: "CTI converges on a single TDM bus", *EDN Access For Design, By Design*, Nov. 20, 1997, pp. 1–9, XP-002253969.

R. Grigonis: "Computer Telephony Encyclopedia", *CMP Books, New York*, pp. 263–268, XP-002253970.

"Architecture Framework revision 1.0", *Enterprise Computer Telephony Forum (ECTF)*, Fremont, CA, May 12, 1997, pp. I–VIII, and 1–44, XP-002131897.

* cited by examiner

*Primary Examiner*—Harry S. Hong
(74) *Attorney, Agent, or Firm*—Laurence A. Greenberg; Werner H. Stemer; Gregory L. Mayback

(57) ABSTRACT

The connection device connects a telecommunications system to a data processing device which provides telecommunications applications. The telecommunications system and the data processing device in each case have a switching network for through-connecting the relevant telecommunications application. The connection device is a switching device directly connected between the respective switching networks.

16 Claims, 3 Drawing Sheets

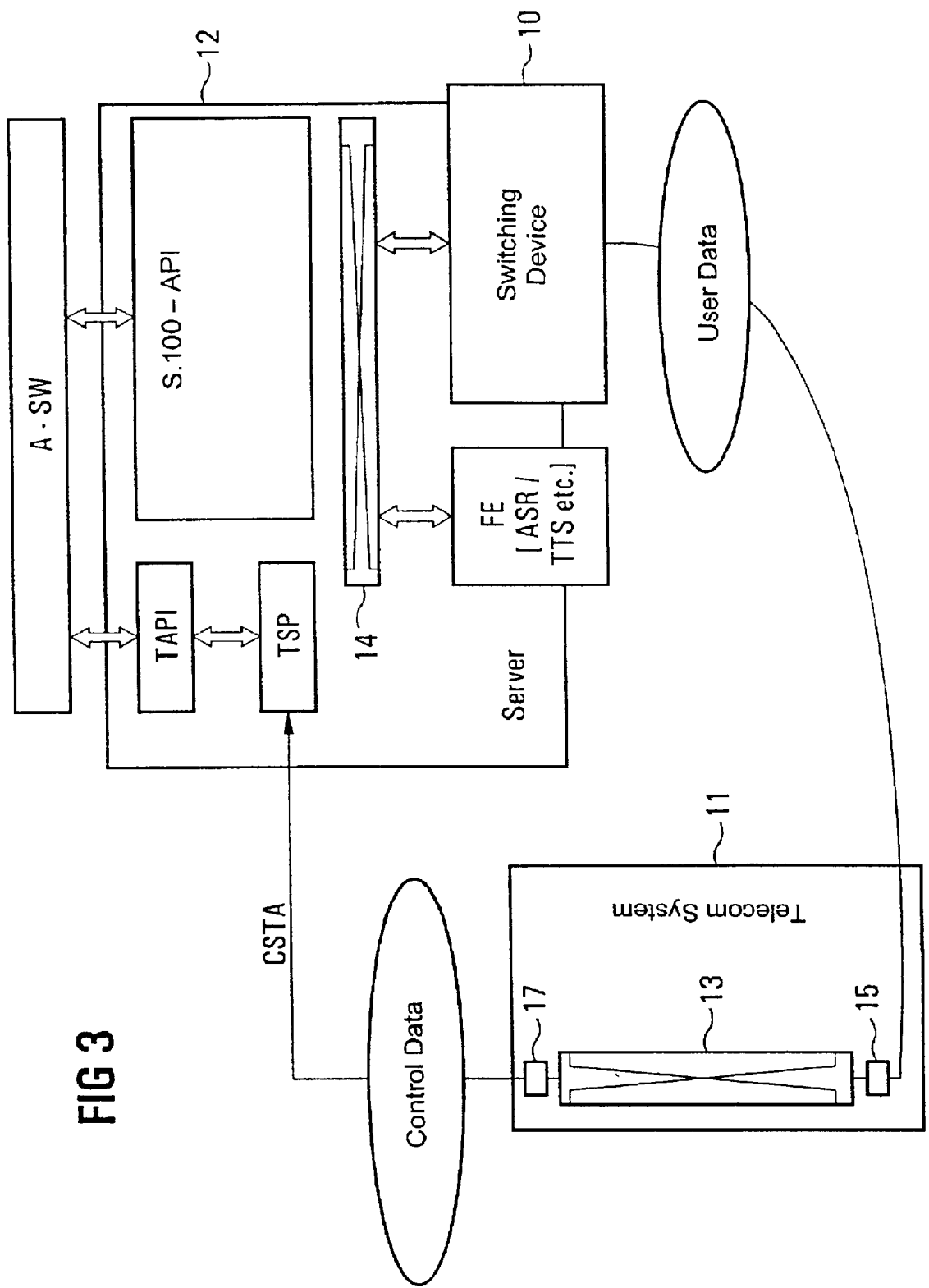

DEVICE FOR CONNECTING A DATA PROCESSING DEVICE TO A TELECOMMUNICATIONS SYSTEM

BACKGROUND OF THE INVENTION

FIELD OF THE INVENTION

The invention lies in the telecommunications technology field and pertains, more specifically, to a connection device for connecting a telecommunications system to a data processing device by means of which telecommunications applications are provided for the telecommunications system.

Supplementary services, such as call center applications, voice recognition, and text-to-speech conversion, which are provided primarily in private telecommunications networks, can be implemented with so-called "Computer Telephony Integration" (CTI). The services—hereinafter referred to as telecommunications applications—are normally implemented by means of central CTI servers (e.g. a media framework) provided in the private telecommunications networks, and are made available to a telecommunications system or its users. Telecommunications applications are made available by means of a CTI server of this type, for example according to the S and H recommendations of the Enterprise Computer Telephony Forum (ECTF).

In order to make the telecommunications applications of a CTI server available to the telecommunications system, a connection—which may be based, for example, on analog, ISDN-oriented or packet-oriented data transmission—is required between the CTI server and the telecommunications system. Control signals and status monitoring between the telecommunications system and the server can be implemented as required via a separate connection according to the CSTA protocol (CSTA=Computer Supported Telecommunications Application).

A connection is established between a CTI server and the telecommunications system via special connection modules—often referred to in the literature as line cards. A connection can be established between a CTI server and the telecommunications system, for example, via connection modules providing analog a/b or digital $S_0$ or $S_{2M}$ interfaces. TDM-oriented (TDM=Time Division Multiplex) switching networks of the telecommunications system and the CTI server are in each case interconnected with the aid in each case of one connection module in the telecommunications system and the CTI server. In this way, one or more user data channels—for example ISDN-oriented B-channels—of the telecommunications system can be connected to the resources of the CTI server.

The disadvantage of this configuration is that expensive line signaling is required for the connection, i.e. for connection set-up and cleardown between the CTI server and the telecommunications system. The line signaling takes up resources, e.g. processor power and memory capacity, in both the telecommunications system and the CTI server. Under load, this results in some instances in long switching times, particularly in medium-sized and large systems.

SUMMARY OF THE INVENTION

The object of the present invention is to provide a device for connecting a data processing device with a telecommunications system which overcomes the above-noted deficiencies and disadvantages of the prior art devices and methods of this general kind, and which enables a simple connection between the telecommunications system and the server for the provision of telecommunications applications.

With the above and other objects in view there is provided, in accordance with the invention, a connection device which connects a telecommunications system and a data processing device providing telecommunications applications. Each of the telecommunications system and the data processing device having a switching network for through-connecting a respective telecommunications application to a user connected to the telecommunications system. The connection device for connecting the telecommunications system to the data processing device is directly connected between the respective switching networks.

According to the present invention, a switching network of the telecommunications system is connected with the aid of the connection device to a switching network of the data processing device—in particular a CTI server based on the conventional S.100 and H.100 specifications—or specific switching points of the relevant switching networks are directly interconnected. For this purpose, according to the invention, the telecommunications system has a first interface for direct connection of the switching network of the telecommunications system to the switching device according to the invention. The first interface, which represents one or more direct switching points of the switching network, is controlled via a virtual subscriber which is set up in the telecommunications system and is assigned to the switching device.

The advantage of the direct interconnection of the two switching networks according to the invention is that hardware cost is substantially reduced compared with the state of the art. The elimination of the connection modules required according to the state of the art in both the telecommunications system and the data processing device results in cost savings compared with the state of the art.

Furthermore, fast switching occurs between the switching network of the telecommunications system and the switching network of the data processing device, e.g. via the Siemens AG SWTI switching network module, since the high-cost line signaling, e.g. during a connection set up or cleardown, can be dispensed with.

In accordance with an added feature of the invention, the connection device is configured to perform a bi-directional conversion between a data format supported by the switching network of the telecommunications system and a data format supported by the switching network of the data processing device.

In accordance with an additional feature of the invention, the connection device in each case interconnects at least one time slot of the respective switching networks.

One or more switching points of the relevant switching networks are advantageously interconnected by the switching device according to the invention. In TDM switching networks (Time Division Multiplex), specific time slots of the switching network of the telecommunications system are directly interconnected by means of the switching device with specific time slots of the switching network of the data processing device.

During the data transmission, the switching device carries out a bidirectional conversion between the data formats supported by the two systems, i.e. the switching device carries out an interface conversion between the switching network of the telecommunications system and the switching network of the data processing device or the relevant switching points.

In accordance with another feature of the invention, the connection device is configured to implement voice data applications between the telecommunications system and the data processing device. The switching device according to the invention is advantageously used by the data processing device for an implementation of speech applications, such as speech recognition and text-to-speech applications.

In accordance with a further feature of the invention, a virtual subscriber is set up in the telecommunications system and assigned to the connection device, for controlling the connection device. In other words, in order to control the specific time slots or switching points of the telecommunications system, the switching point(s) must be defined as a virtual—preferably exclusively software-implemented—subscriber of the telecommunications system. This/these switching point(s) can thus be addressed in the same way as a conventional extension of the telecommunications system.

In accordance with again an added feature of the invention, a separate connection is provided to transmit control and monitoring information between the telecommunications system and the data processing device according to the CSTA protocol.

In other words, the switching points used in the telecommunications system are controlled and monitored via a second interface, advantageously via the standardized CSTA protocol (Computer Supported Telecommunications Application).

In accordance with again another feature of the invention, the connection device is a separate device. In the alternative, the connection device is implemented as an interface unit in the data processing device.

Other features which are considered as characteristic for the invention are set forth in the appended claims.

Although the invention is illustrated and described herein as embodied in a device for connecting a data processing device to a telecommunications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a structural diagram illustrating an embodiment of the present invention.

DESCRIPTION OF THE PREFERRED EMBODIMENTS

Figure 1:
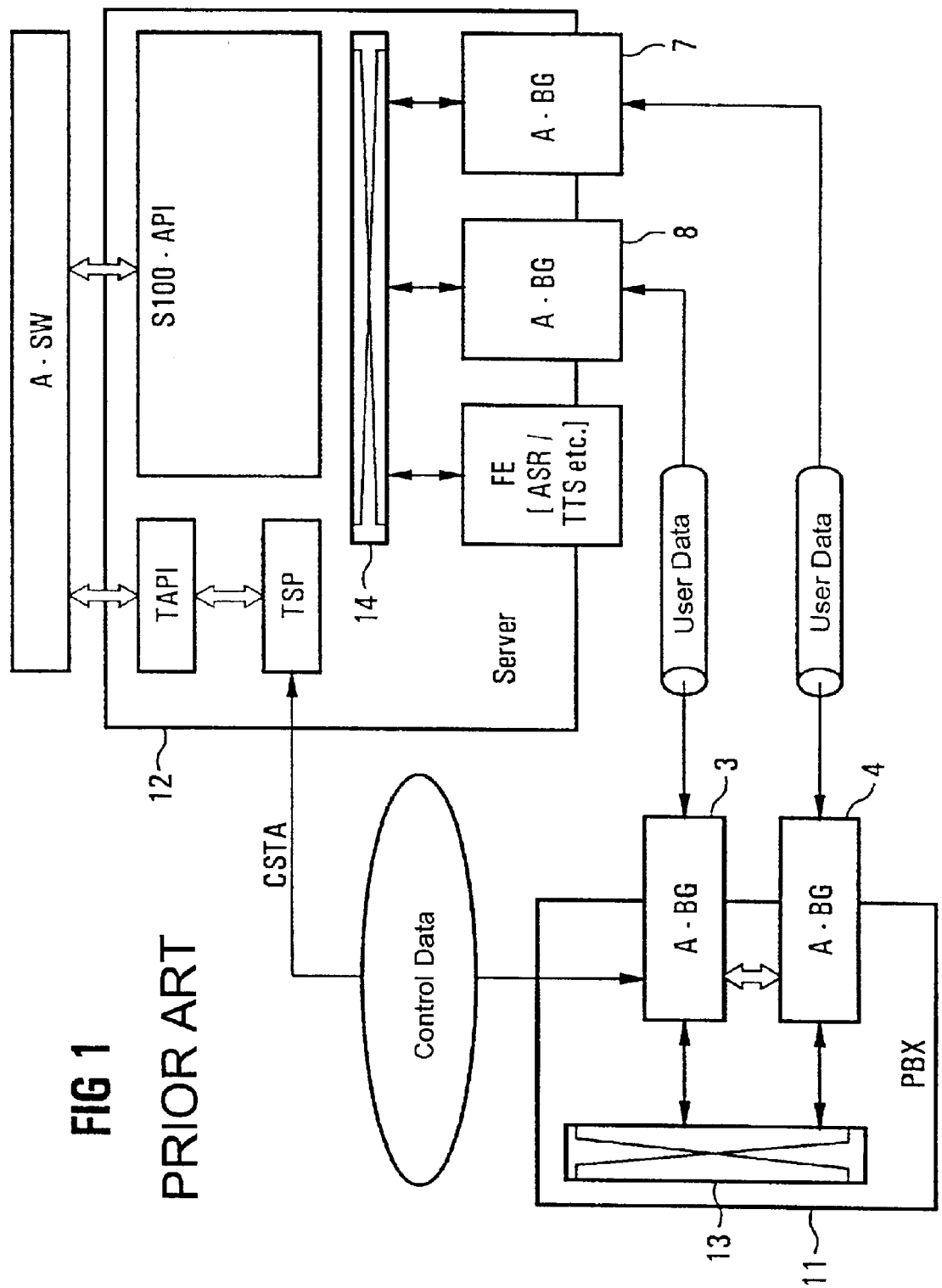
FIG. 1 is a structural diagram schematically representing a prior art system.

Referring now to the figures of the drawing in detail and first, particularly, to FIG. 1 thereof, there is seen a prior art CTI configuration. The configuration comprises a telecommunications system 11 and a CTI server 12—in particular a media framework designed according to the known S.100 and H.100 specifications—for the provision of telecommunications applications for the telecommunications system 11 or subscribers—not shown—assigned to the telecommunications system 11.

The telecommunications system 11 sets up a connection to the external CTI server 12 via a switching network 13. The interfaces for data transmission are in each case formed by connection modules 3 and 4 of the telecommunications system 11 or by connection modules 7 and 8 of the CTI server 12. Data transmission can be carried out, for example, according to a time-slot-oriented continuous transmission method and/or according to a packet-oriented transmission method.

In the CTI server 12, a connection is set up via the switching network 14—preferably configured according to the H.100 specification—with function units FE—frequently referred to in the literature as 'Resource Boards'—which implement the relevant telecommunications applications—e.g. speech recognition (ASR= Automatic Speech Recognition) or text-to-speech (TTS). These function units FE access application software A-SW which controls the relevant telecommunications applications via an interface S.100-API (API=Application Programming Interface). The application software A-SW is in turn connected via suitable interfaces TAPI (Telephony Application Programming Interface) and TSP (Telephony Service Provider) to the telecommunications system 11. Information is transmitted via these interfaces according to the CSTA protocol (CSTA=Computer Supported Telecommunications Application) for control and monitoring between the telecommunications system 11 and the CTI server 12.

Figure 2:
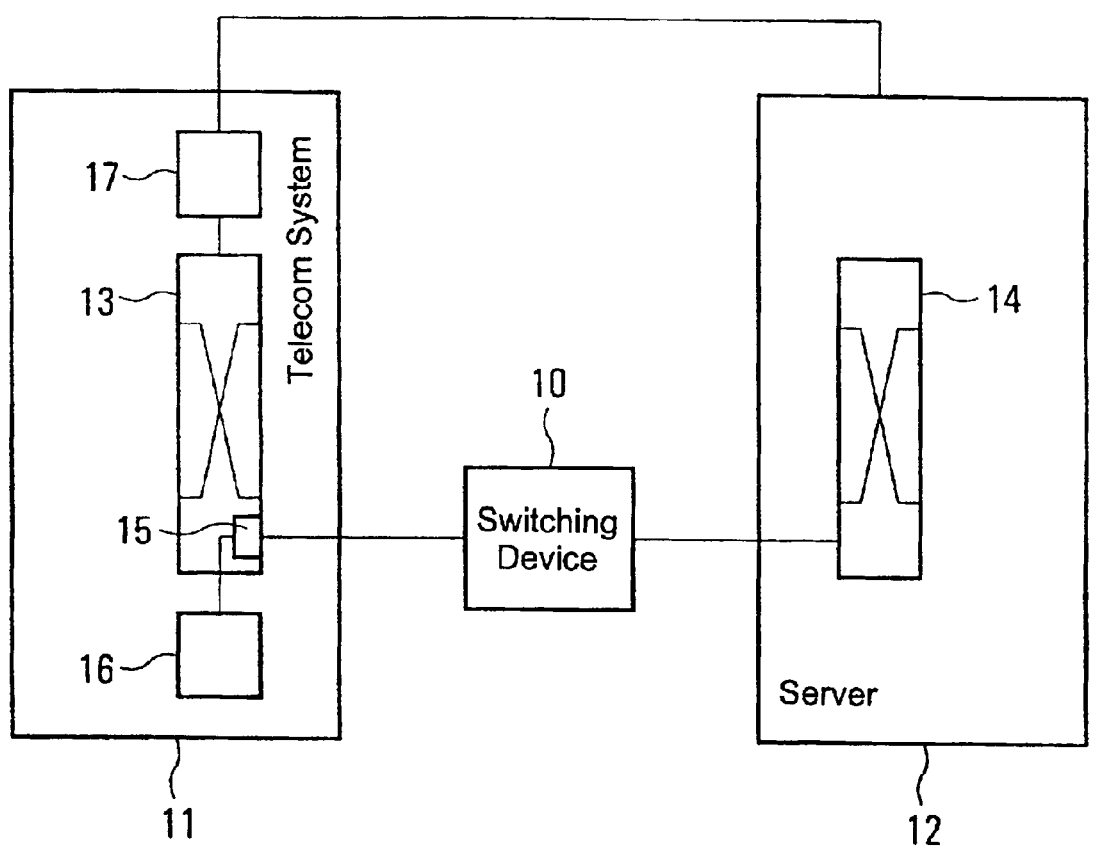
FIG. 2 is a block diagram schematically representing a connection between a telecommunications system and a data processing device according to the invention.

FIG. 2 shows a structural diagram schematically representing a connection between the telecommunications system 11 and the CTI server 12 according to the invention.

The switching device 10 according to the invention interconnects the relevant switching networks 13 and 14 or specific switching points of the switching networks 13 and 14 of the telecommunications system 11 and the CTI server 12. These switching points correspond, for example in a TDM-oriented switching network, to one or more time slots, which are in each case directly interconnected via the switching device 10.

To connect the switching device 10 according to the invention to the telecommunications system 11, the telecommunications system 11 has a first interface 15, which directly provides one or more switching points of the switching network 13. In order to address the switching points by means of the telecommunications system 11 or by means of a control unit—not shown—of the telecommunications system 11, a virtual subscriber is set up in the telecommunications system 11 via a, preferably software-implemented, subscriber device 16. The interface 15 is addressed via the virtual subscriber, for example via extensions of the telecommunications system 11 or via the CTI server 12 by means of the CSTA protocol via a second interface 17 of the telecommunications system 11.

The switching device 10 according to the invention is advantageously an autonomous device which is connected externally between the telecommunications system 11 and the CTI server 12 or is alternatively implemented as an internal interface in the CTI server 12.

Referring now to FIG. 3, there is shown an embodiment of the present invention. As compared with the prior art FIG. 1, the connection modules for connecting the telecommunications system 11 to the CTI server 12 are dispensed with. The further components shown in FIG. 3 have already been explained with reference to FIGS. 1 and 2.

With the aid of the switching device 10 according to the invention, which can be implemented, for example, with the Siemens AG TEB SWT1 switching network component, the external CTI server 12 is connected as an extension box via a standard connection cable to existing telecommunications systems 11.

The switching device 10 according to the invention is incorporated as a basic hardware component, for example for a S.100 media server as a resource for a call channel, into a suitable S.100 environment (for example, Dialogic/Microsoft S.100 API).

I claim:

1. In combination with a telecommunications system and a data processing device providing telecommunications applications, each of the telecommunications system and the data processing device having a switching network for through-connecting a respective telecommunications application to a user connected to the telecommunications system, a connection device for connecting the telecommunications system to the data processing device directly connected to the respective switching networks.

2. The combination according to claim 1, wherein said connection device is configured to perform a bi-directional conversion between a data format supported by the switching network of the telecommunications system and a data format supported by the switching network of the data processing device.

3. The combination according to claim 1, wherein said connection device in each case interconnects at least one time slot of the respective switching networks.

4. The combination according to claim 1, wherein said connection device is configured to implement voice data applications between the telecommunications system and the data processing device.

5. The combination according to claim 1, which further comprises a virtual subscriber set up in the telecommunications system and assigned to said connection device, for controlling said connection device.

6. The combination according to claim 1, which comprises a separate connection configured to transmit control and monitoring information between the telecommunications system and the data processing device according to the CSTA protocol.

7. The combination according to claim 1, wherein said connection device is a separate device.

8. The combination according to claim 1, wherein said connection device is implemented as an interface unit in the data processing device.

9. In a connection between a telecommunications system and a data processing device providing telecommunications applications, each of the telecommunications system and the data processing device having a switching network for through-connecting a respective telecommunications application to a user connected to the telecommunications system, the improvement which comprises a connection device for connecting the telecommunications system to the data processing device directly connected to the switching network of the telecommunications system and to the switching network of the data processing device.

10. The connection according to claim 9, wherein said connection device is configured to perform a bi-directional conversion between a data format supported by the switching network of the telecommunications system and a data format supported by the switching network of the data processing device.

11. The connection according to claim 9, wherein said connection device in each case interconnects at least one time slot of the respective switching networks.

12. The connection according to claim 9, wherein said connection device is configured to implement voice data applications between the telecommunications system and the data processing device.

13. The connection according to claim 9, which further comprises a virtual subscriber set up in the telecommunications system and assigned to said connection device, for controlling said connection device.

14. The connection according to claim 9, which comprises a separate connection configured to transmit control and monitoring information between the telecommunications system and the data processing device according to the CSTA protocol.

15. The connection according to claim 9, wherein said connection device is a separate, standalone switching device.

16. The connection according to claim 9, wherein said connection device is implemented as an interface unit in the data processing device.

* * * * *